United States Patent [19]
Sakurai et al.

[11] Patent Number: 5,931,274
[45] Date of Patent: Aug. 3, 1999

[54] ELECTROMAGNETIC CLUTCH

[75] Inventors: Yusuke Sakurai, Nagoya; Toshihiro Hayashi, Chiryu, both of Japan

[73] Assignee: Denso Corporation, Kariya-city, Japan

[21] Appl. No.: 08/928,404

[22] Filed: Sep. 12, 1997

[30] Foreign Application Priority Data

Sep. 13, 1996 [JP] Japan .................................. 8-243748

[51] Int. Cl.⁶ .................................................. F16D 27/112
[52] U.S. Cl. .................................. 192/84.961; 192/113.5
[58] Field of Search ............................ 192/84.1, 84.9, 192/84.95, 84.951, 84.96, 84.961, 113.5; 417/319; 62/323.4

[56] References Cited

U.S. PATENT DOCUMENTS 5,199,541  4/1993  Tobyama et al. ............... 192/84.961 X
5,372,228  12/1994  VanLaningham et al. ..... 192/84.961 X

FOREIGN PATENT DOCUMENTS

4-3133   1/1992   Japan .

*Primary Examiner*—Richard M. Lorence
*Attorney, Agent, or Firm*—Pillsbury Madison & Sutro LLP

[57] ABSTRACT

An electromagnetic clutch for use with a compressor for an automobile air conditioning system includes a back cover provided at an end wall (26) of an armature (15) which moves to engage and disengage a rotor. The back cover has visored slits (30) with visors (30a) which align with arcuate slots (24) of an armature (28). The air between the armature and the rotor is released through the slits to prevent over compression of the air when the armature is attracted to the rotor. The visor of the back cover prevents an oil leaking from the compressor from invading into the contacting surfaces of the clutch through the arcuate slots of the armature (15).

6 Claims, 8 Drawing Sheets

Fig. 7
PRIOR ART

ELECTROMAGNETIC CLUTCH

BACKGROUND OF THE INVENTION

1. Field of the Invention

The invention relates to an electromagnetic clutch, for use with a compressor for an automobile air conditioning system, improved to prevent a compressor lubricating oil from entering the contacting surfaces between a rotor and an armature.

2. Description of the Related Art

Figure 6A:
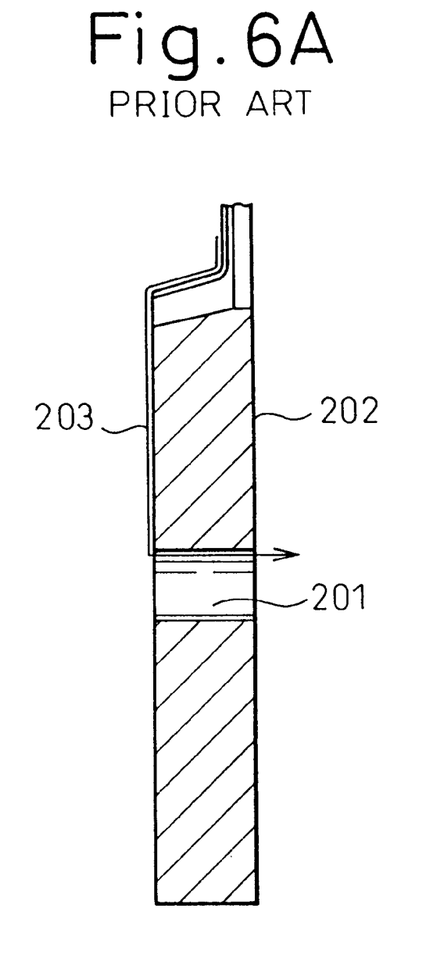
FIG. 6A a partial section of an electromagnetic clutch of a prior art and illustrates how oil flows in the electromagnetic clutch of the prior art.

In an electromagnetic clutch for use with a compressor for an automobile air conditioning system of a prior art, as indicated in FIG. 6A, a compressor oil collected at a ring shield provided on an inner circumference of a rotor of the clutch, or the oil that moves along a rotational shaft of the compressor may spatter to invade contacting surfaces 202 through arcuate slots 201 for providing a magnetic path.

Figure 6B:
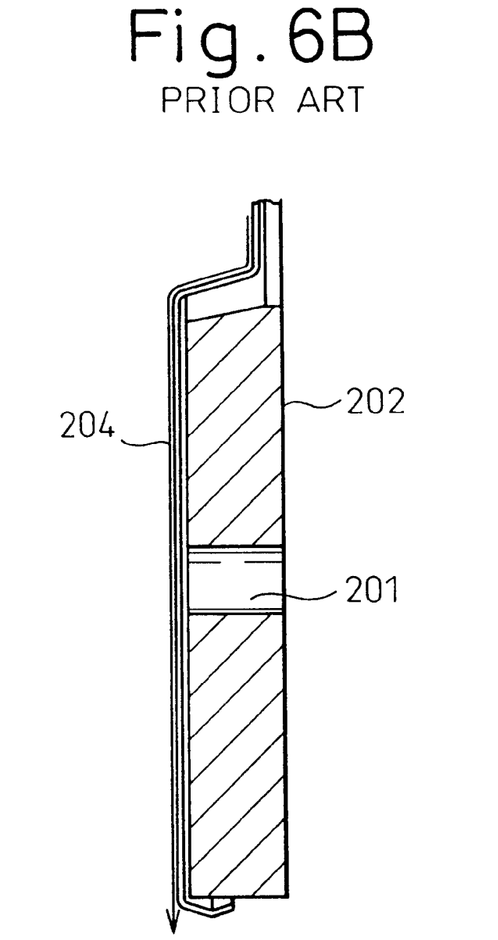
FIG. 6B is a partial section of an electromagnetic clutch of another prior art similar to that of FIG. 6B.

Japanese Examined Utility Model Publication (Kokoku) No.4-3133 discloses a compressor with a back cover attached to an end wall of an armature to prevent the invasion of compressor lubricating oil leaking out through a shaft seal of the compressor into contacting surfaces of the armature and a rotor of an electromagnetic clutch so that the loss of friction-engagement force at the contacting surfaces is reduced. With reference to FIG. 6B, the prior art prevents invasion of oil through arcuate slots 201 because a back cover provided at the end wall of the armature plate closes the arcuate slots in the armature plate.

However, the electromagnetic clutch described above encounters a problem in that the noise caused by the sudden compression of the air between an armature and a rotor that takes place when the electromagnetic coil is energized is accelerated due to the provision of the back cover.

Figure 7:
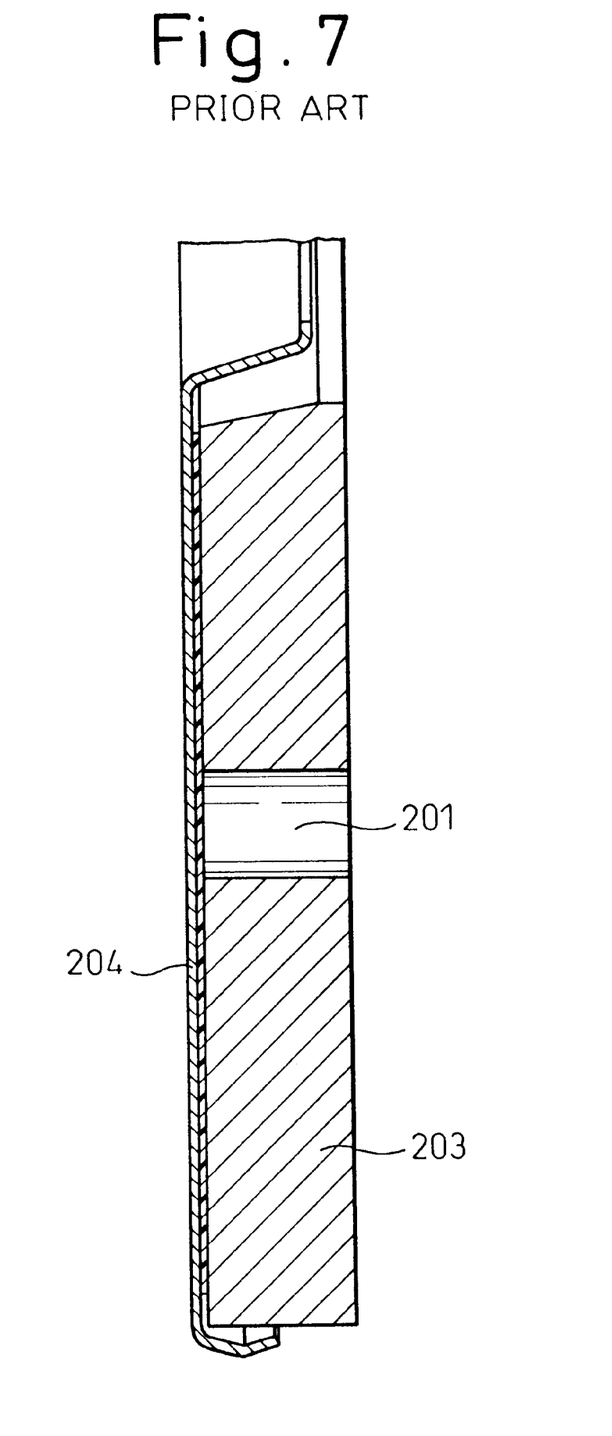
FIG. 7 is a partial enlarged view of the electromagnetic clutch of FIG. 6B.

When the armature is attracted to the rotor, the air between the armature and the rotor is suddenly compressed to become compressed air, and is discharged through the gap between the armature and the rotor. The discharged air generates shock wave which reaches the human ear as noise. In the prior art, as shown in FIG. 7, the escape route for the compressed air is limited to the gap between the armature and the rotor only to interfere with smooth discharge of the compressed air. The excessive compression of the air is even increased compared with case without a back cover because the back cover 204 attached to the end wall of the armature plate 203 closes the arcuate slots 201, resulting in a problem of further increased noise caused by the shock wave.

SUMMARY OF THE INVENTION

The invention improves the compressor of a type disclosed in Japanese Examined Utility Model Publication (Kokoku) No.4-3133 to minimize the noise caused by compressed air when an armature is attracted.

The invention provides an electromagnetic clutch which comprises an annular rotor mounted, for rotation around a rotational axis the annular rotor having a friction surface at an end wall; an annular armature provided to face the friction surface of the rotor, the armature including a friction surface to be engaged by friction with the friction surface of the rotor, and an arcuate slot for forming magnetic path; an electromagnetic coil for attracting the armature to the rotor when energized; a ring shield, for collecting the oil which leaks out through the shaft seal, provided on the inner circumferences of the rotor and the armature; a back cover in the form of an annular plate provided on the armature at the opposite end surface to the friction wall; and the back cover including a slit for releasing air between the rotor and the armature through the arcuate slot when the electromagnetic coil is energized to attract the armature to the rotor, and a visor provided over the slit to prevent the oil leaking out the ring shield from invading into the engagement portion between the friction walls through the arcuate slots of the armature.

The oil leaking out the shaft seal of the compressor is stopped at the annular ring shield provided at front portion of the rotor bearing so that it may not invade the contacting surfaces of the clutch. When the leaked oil increases beyond a maximum oil capacity of the ring shield, the oil overflows to the back cover on the armature. The oil coming onto the back cover is discharged outside of the clutch without invading into the contacting surfaces of the clutch through the arcuate slots of the armature by the visor of the invention.

In this way, the invention provides an electromagnetic clutch that has functions of both mitigating the noise of compressed air at the time of attraction at the clutch and preventing leaked oil from invading into the contacting surfaces of the clutch by adopting a simple structure for forming a visored slit in the back cover for an armature.

DESCRIPTION OF THE DRAWINGS

These and other objects and advantages and a further description will now be discussed in connection with the drawings in which.

DESCRIPTION OF THE PREFERRED EMBODIMENTS

Figure 1:
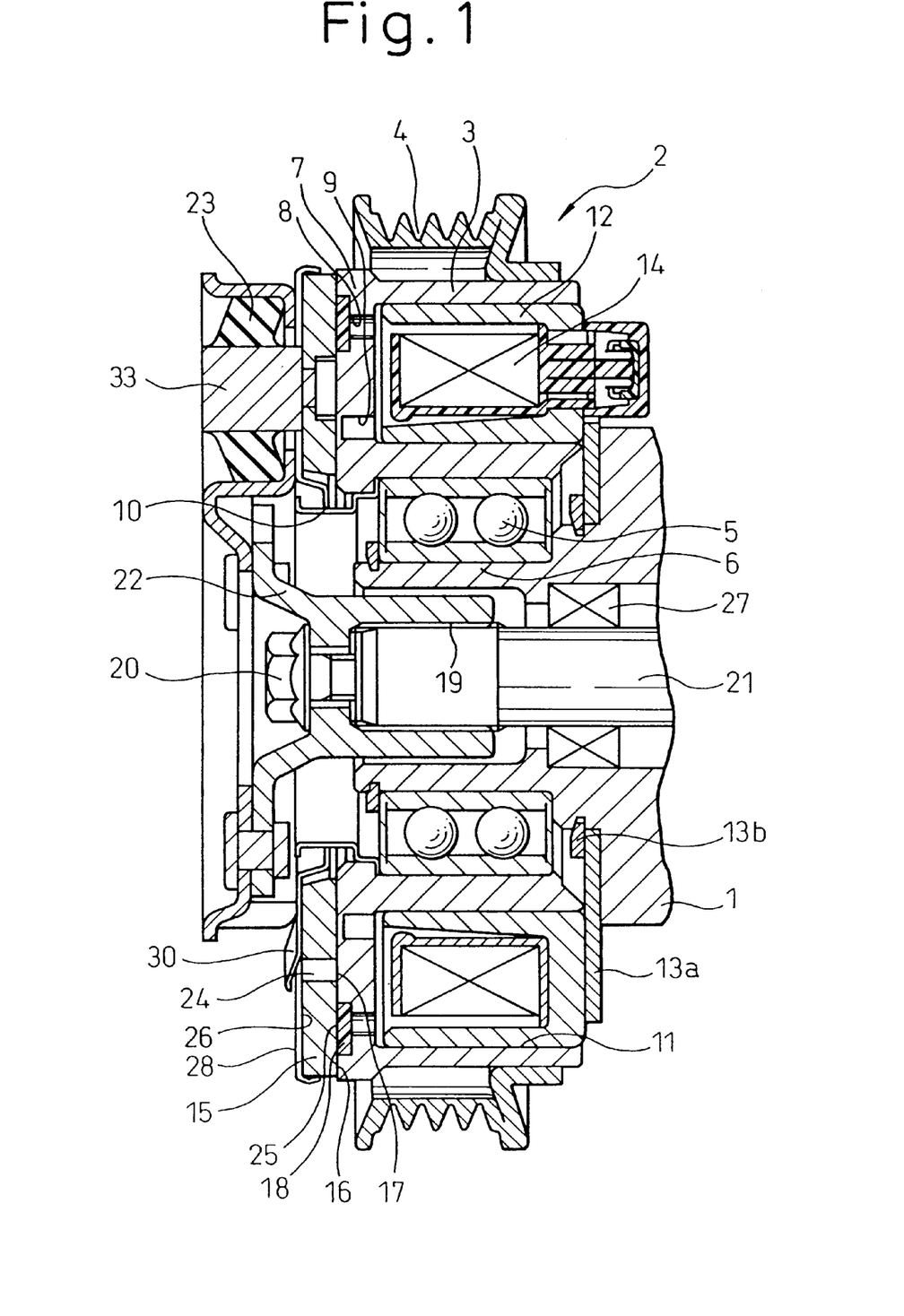
FIG. 1 is a schematic sectional view of the electromagnetic clutch according to the invention.
Figure 2:
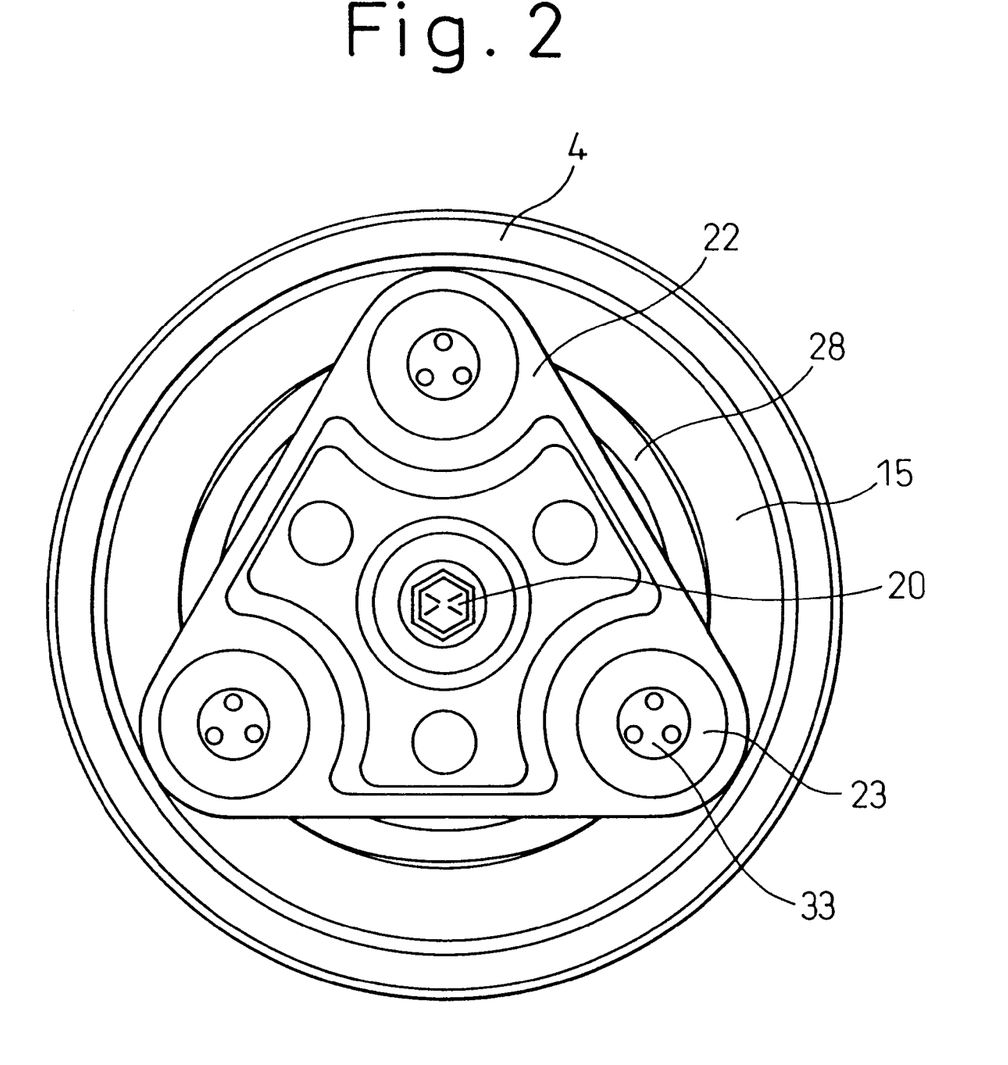
FIG. 2 is a side view of the electromagnetic clutch of the invention.

With reference to FIGS. 1 to 5, the preferred embodiment of the invention will be described. FIG. 1 is a section of an electromagnetic clutch of the invention applied to a compressor for an automobile air-conditioner as an example. In FIG. 1, 1 denotes a housing of a compressor for an automobile air conditioner, and 2 denotes an electromagnetic clutch of the invention for connecting and disconnecting the rotational power transmission between the compressor and an automobile engine as a rotational power source.

A rotor 3 is supported for rotation around the outer circumference of a cylindrical portion 6 of the housing 1 of the compressor by a bearing 5. A pulley 4, for receiving a rotational power form a crankshaft of the automobile engine through a driving belt, is integrally connected to the rotor 3 by welding, etc. Arcuate slots 8 and 9, for forming a four pole magnetic path, are provided in an end wall 7 of the rotor 3 to extend along inner and outer concentric circles (not shown). A ring shield 10 for collecting oil is attached to the inner circumference of the end wall 7.

A stator housing 12, which is substantially C-shaped in its cross section, is placed in a cavity 11 of the rotor 3 with a small gap remaining therebetween (in the drawings, the small gap is not shown). The stator housing 12 is fastened to the housing of the compressor by an annular plate 13a and a snap ring 13b. An electromagnetic coil 14 is provided within the stator housing 12. When energized, the electromagnetic coil 14 attracts the armature 15 to the rotor 3 to connect the armature 15 and the rotor 3 by friction so that the rotational power is transmitted from the automobile engine to the compressor.

The end wall 7 of the rotor 3 includes an end face 16 to provide an annular friction surface 17 which faces the armature 15 with a small gap therebetween. An annular friction member 18 is adhesively fastened to the friction surface 17 to aid the frictional connection between the rotor 3 and the armature 15.

The armature 15 is made, of a magnetic material containing iron, into an annular plate, and is elastically supported by a rubber bush 23 for axially shifting against a hub 22 which is connected to a rotational shaft 21 of the compressor through a spline 19 and a bolt 20. Arcuate slots 24 for forming a magnetic path are provided in the armature 15 along a circle at an interval to align the slits 8 and 9 of the rotor 3. In this embodiment, three arcuate slots 24 are provided to extend through the armature 15 from the friction surface 25 to an opposite end face 26.

Figure 3A:
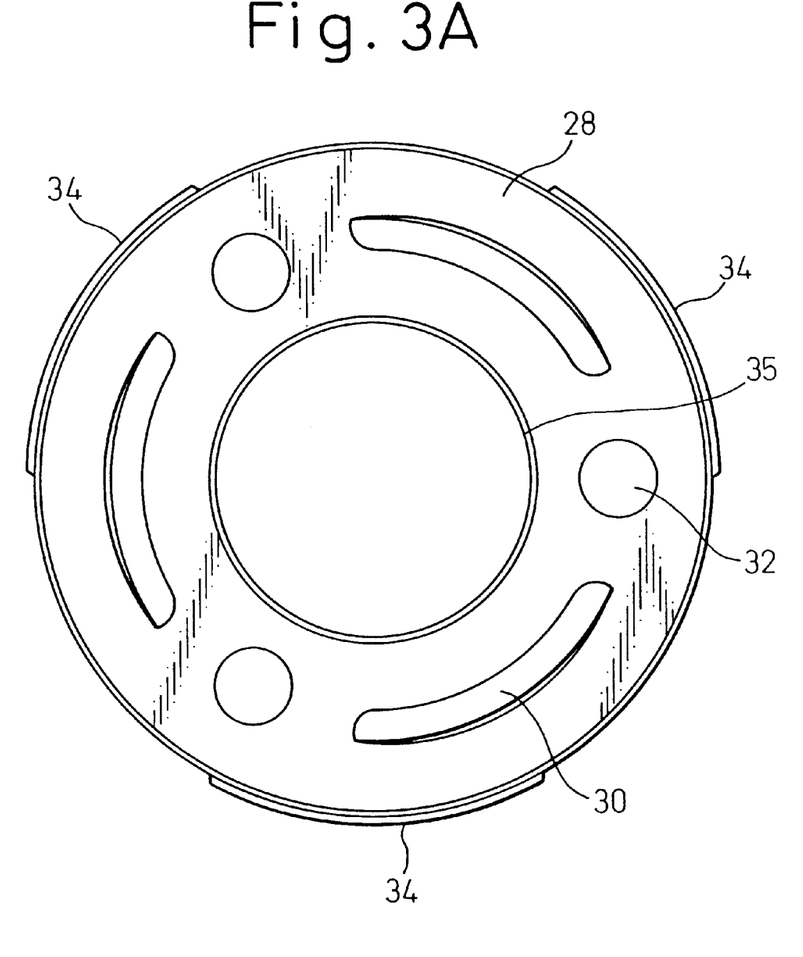
FIG. 3A is a plan view of the back cover according to the invention.
Figure 3B:
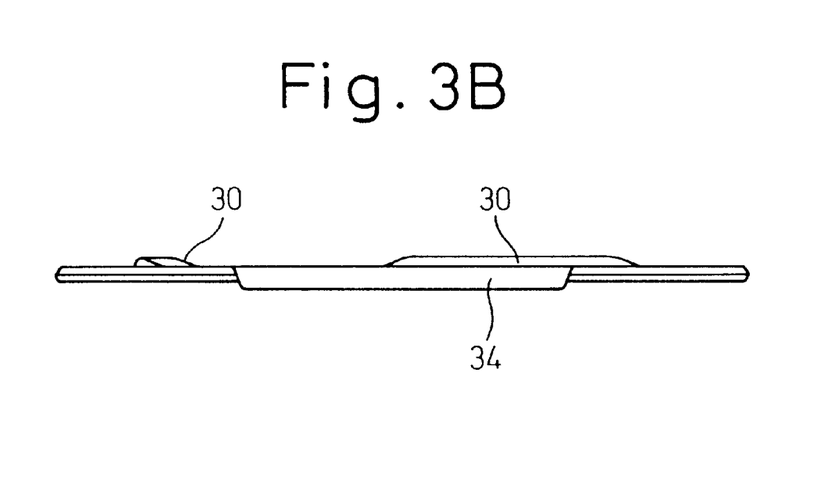
FIG. 3B is a side view of the back cover of FIG. 3A along line III—III.
Figure 4:
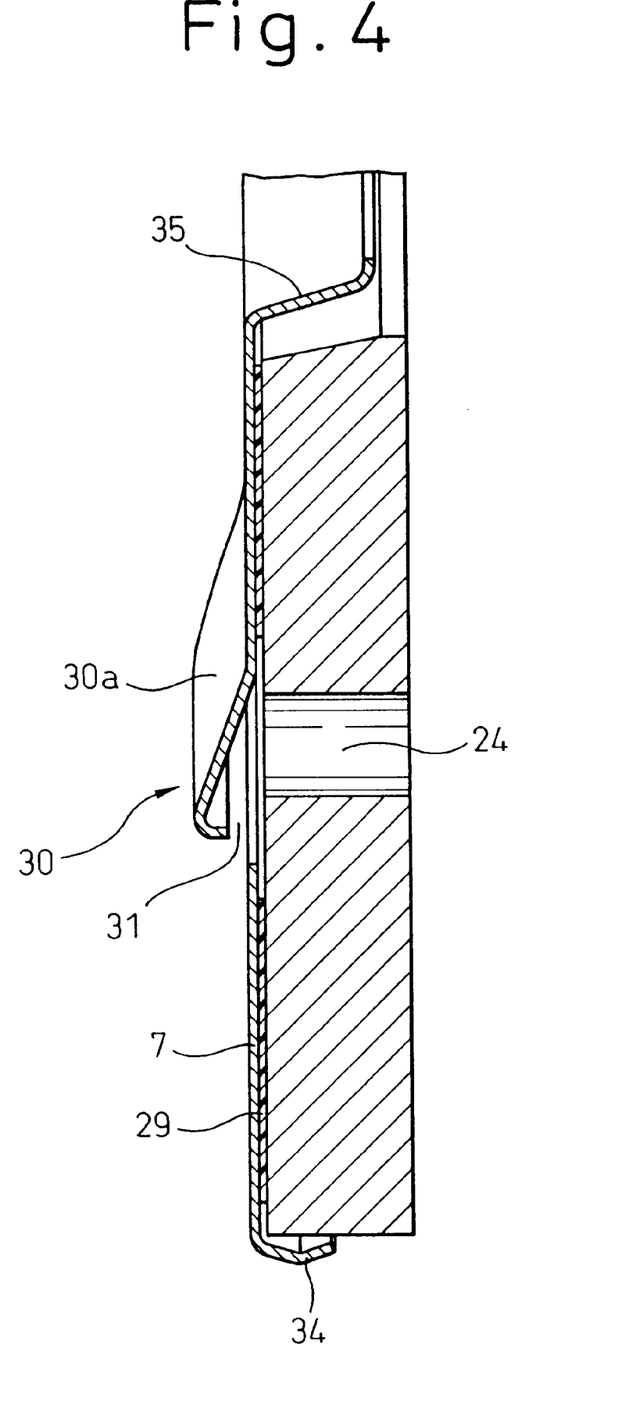
FIG. 4 is a partial enlarged section of the electromagnetic clutch according to the invention.
Figure 5A:
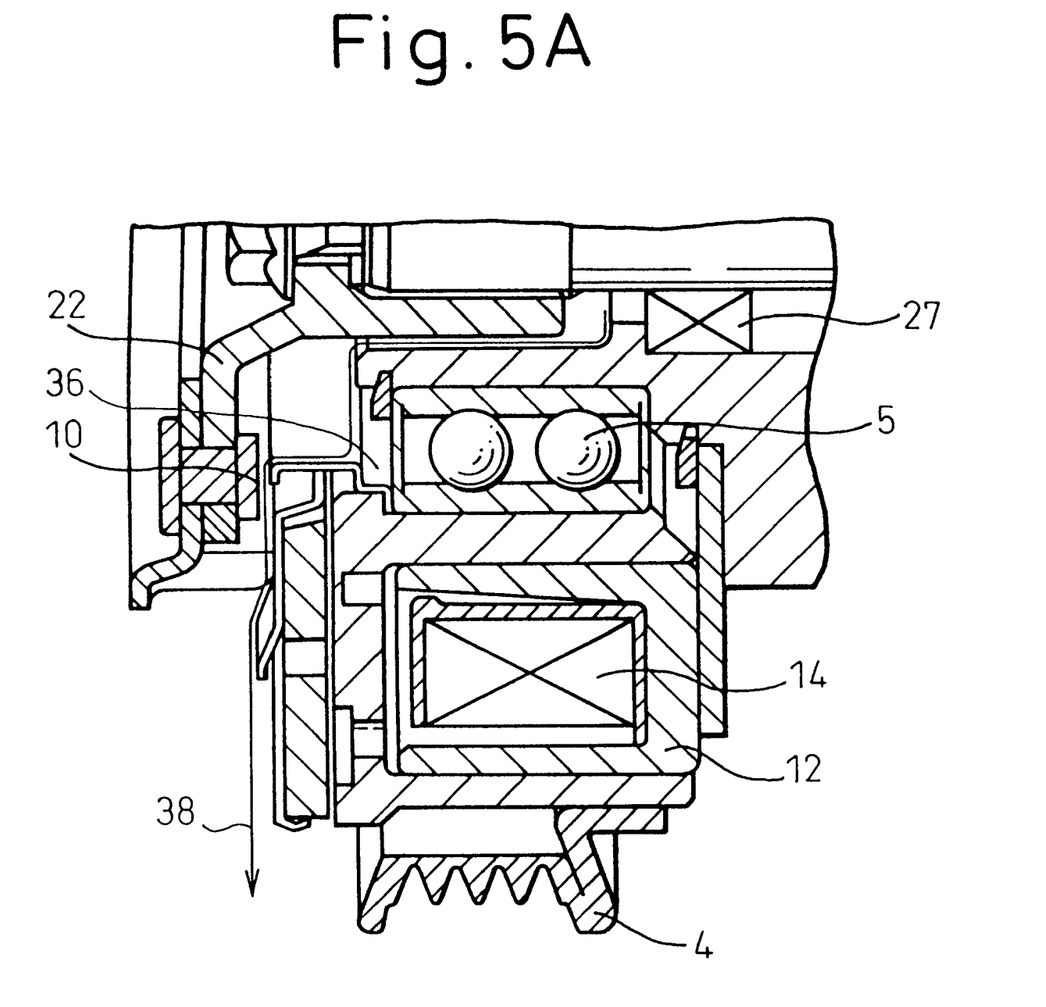
FIG. 5A a partial section of the electromagnetic clutch of the invention and illustrates how the oil is discharged.
Figure 5B:
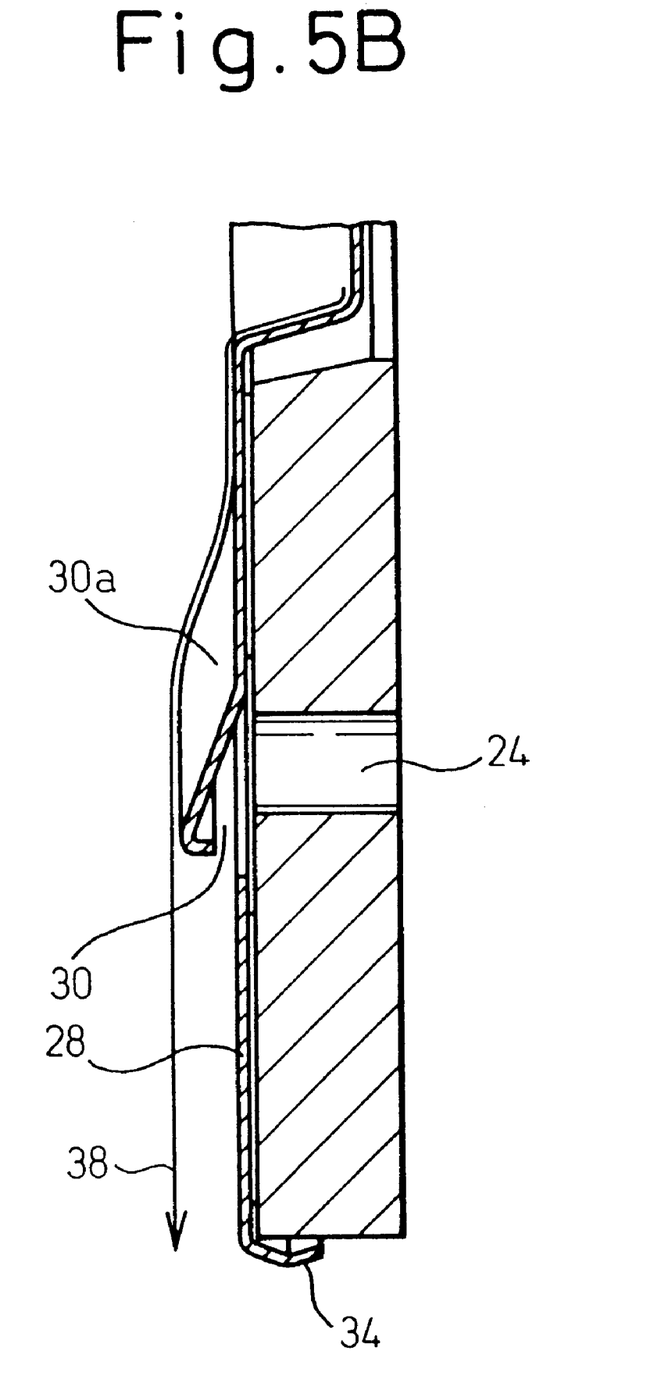
FIG. 5B is an partial enlarged section of the electromagnetic clutch of FIG. 5A.

A back cover 28, for preventing oil leaking through a shaft seal 27 from reaching the contacting surfaces, is attached to the end wall 26 of the armature 15 by an adhesive sheet 29. As shown in FIGS. 3A and 3B, the back cover 28 is substantially formed into an annular plate with visored slits 30 which are disposed to align with the arcuate openings 24 of the armature 15 when assembled. The visored slits 30 have visors 30a which outwardly protrude over the slits 30 by a clearance 31. The visored slits 30 may be formed by a press machining so that the visors 30a protrude axially outward direction while the visors 30a are connected to the annular plate along the radially inner periphery thereof. The hub 22 is connected to the armature 15 by rivets 33 through rivet holes 32. Engagement portions 34 are provided at an interval along the outer circumference of the back cover 28 by bending over the outer circumference of the armature 15.

A sleeve portion 35 is provided along the inner circumference of the back cover 28. The sleeve portion 35 axially extends along the inner circumference of the armature 15 to face between the inner circumference of the armature 15 and the outer circumference of the ring shield 10 so that the oil should not invade from the inner circumferences of the rotor 3 and the armature 15 directly into the contacting portion where the friction wall 17 of the rotor 3 and the friction surface 25 of the armature 15 contact.

Thus the magnetic path is formed by the rotor 3, the stator housing 12 and the armature 15.

Following is an explanation of the operation of the electromagnetic clutch according to the embodiment of the invention.

When the magnetic coil 14 is energized, the magnetic coil 14 produces magnetic flux, which overcomes the urging force of the rubber bush 23 so that the armature 15 is attracted to the friction surface 17 of the rotor 3. Thus, the rotational movement of the rotor 3 is transmitted to the hub 22 through the armature 15 and the rivet 33. When the electric power to the magnetic coil 14 is turned off, the armature 15 moves away from the rotor 3 by the urging force of the rubber bush 23 and returns to the position indicated in FIG. 1 so that the transmission of the rotational movement to the rotation shaft 21 of the compressor is stopped.

After a long operating time of the electromagnetic clutch 2, in a prior art compressor, as described above, the oil leaks out of the housing 1 of the compressor through the shaft seal 27 to be collected at the ring shield 10 around a region indicated by reference number "36" (FIG. 5A) and thereafter further leaks, or spatters from the end of the rotation shaft 21 of the compressor to adhere to the end wall 26 of the armature 15 or to the inner circumference face of the armature 15. The electromagnetic clutch of the prior art encounters in a problem in that the leaked oil invades into the contacting surfaces of the clutch through the arcuate slots of the armature as shown in FIG. 6A. The electromagnetic clutch 2 of the invention is equipped with the back cover 28 at the end wall 16 of the armature to cover the arcuate slots 24. The back cover 28 has the visors 30a over the arcuate slots 24 so that the leaked oil which leaks through the shaft seal 27 to the back cover 28 is discharged outside of the compressor along the back cover 28, in particular over the visors 30a, as shown by an arrow 38 in FIG. 5A, and is prevented from invading into the arcuate slots 24.

Further, the back cover 28 of the invention, unlike the annular plate of Japanese Examined Utility Model Publication (Kokoku) No.4-3133, comprises the visored slits 30 with visors 30 which cover the arcuate slots 24 of the armature 15 while the slits constitute continuous openings in cooperation with the arcuate slots 24. This allows the air between the armature 15 and the rotor 3 to be discharged as well as through the gap between the armature and the rotor when the air is suddenly compressed by the attraction of the armature 15, thus the pressure of the compressed air is reduced to minimize the shock wave produced when the air is discharged, and the noise caused by the compressed air when the armature is attracted is reduced as the compressed air can be discharged smoothly.

Although the embodiment described herein is an electromagnetic clutch for connecting and disconnecting the transmission of power between an automobile engine and a compressor for an automobile air-conditioning system, the invention can be applied to an electromagnetic clutch for connecting and disconnecting the transmission of power between another driving source and another driven member.

It will also be understood by those skilled in the art that the forgoing description is a preferred embodiment of the disclosed device and that various changes and modifications may be made without departing from the spirit and scope of the invention.

We claim:

1. An electromagnetic clutch comprising:
   an annular rotor mounted, for rotation, around a rotational axis, the annular rotor having a friction surface at an end wall thereof;
   an annular armature provided to face the friction surface of the rotor, the armature including a friction surface to be frictionally engaged with the friction surface of the rotor, and an arcuate slot for forming a magnetic path;
   an electromagnetic coil for attracting the armature to the rotor when energized;

a ring shield, for collecting oil which leaks out through a shaft seal, said ring shield being mounted to the rotor and provided adjacent the inner circumferences of the rotor and the armature;

a back cover in the form of an annular plate provided on the armature at an end surface thereof opposite to the friction surface of the armature; and the back cover including a slit for releasing air between the rotor and the armature through the arcuate slot when the electromagnetic coil is energized to attract the armature to the rotor, and a visor provided over the slit to prevent leaking oil from invading into an engagement portion between the friction surfaces through the arcuate slot of the armature.

2. An electromagnetic clutch according to claim 1 in which the back cover has an inner circumference having an axial portion axially extending to face the inner circumference of the armature and an outer circumference of the ring shield.

3. An electromagnetic clutch according to claim 1 in which the oil leaking out the ring shield is guided over the visor of the back cover and is discharged outside.

4. An electromagnetic clutch for transmission of a rotational power to a compressor for use in an automobile air conditioning system from an automobile engine, the compressor including a housing, a rotational shaft supported by the housing, and a shaft seal provided between the housing and the rotational shaft, the electromagnetic clutch comprising:

an annular rotor, for receiving the rotational power from the automobile engine, adapted to be mounted to the housing for rotation by a bearing, the annular rotor having an inner and outer circumference and an end wall, the end wall providing a friction surface;

an annular armature adapted to be mounted on the rotational shaft for rotation with the shaft to face the friction surface of the rotor, the armature including a friction surface for frictionally engaging the friction surface of the rotor, inner and outer circumferences and an arcuate slot for forming a magnetic path;

an electromagnetic coil provided within the rotor, the armature moving to the rotor so that the friction surfaces of the armature and the rotor frictionally engage to enable the transmission of rotational power from the rotor to the rotational shaft of the compressor when the electromagnetic coil is energized;

a ring shield, for collecting an oil which leaks out through the shaft seal, mounted to the rotor and provided adjacent the inner circumferences of the rotor and the armature;

a back cover in the form of an annular plate provided on the armature at the opposite end surface to the friction surface of the armature; and the back cover including a slit for releasing air between the rotor and the armature through the arcuate slot when the electromagnetic coil is energized to attract the armature to the rotor, and a visor provided over the slit to prevent oil leaking out the ring shield from invading into an engagement a portion between the friction surfaces through the arcuate slot of the armature.

5. An electromagnetic clutch according to claim 4 in which the back cover has an inner circumference having an axial portion axially extending to face the inner circumference of the armature and an outer circumference of the ring shield.

6. An electromagnetic clutch according to claim 5 in which the armature includes three slots in the form of an oblong arc, for forming a magnetic path, provided in the end wall along a circle concentric with the armature, and the back cover including three slits in the form of an oblong arc to align with the respective slots of the armature, and three visors over the respective slits, the visors being connected to the back cover.

* * * * *